A. S. Southworth,
Daguerreotype Camera Attachment.
N° 12,700.  Patented Apr. 10, 1855.
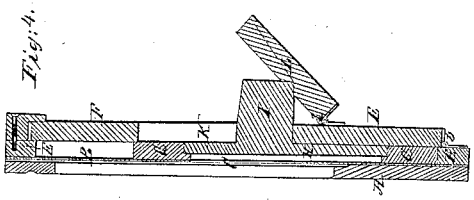
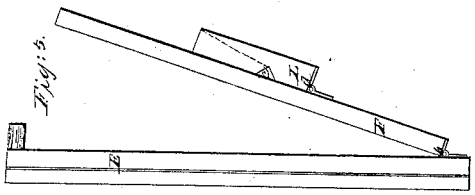
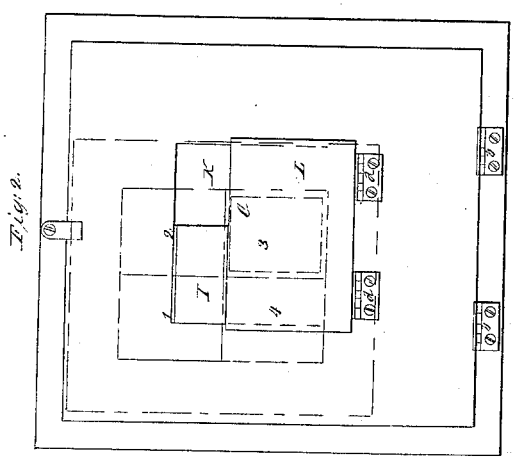
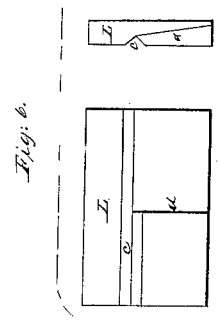
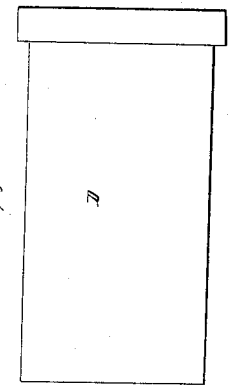
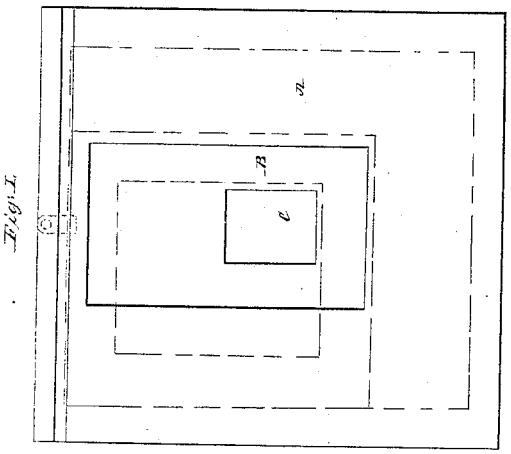
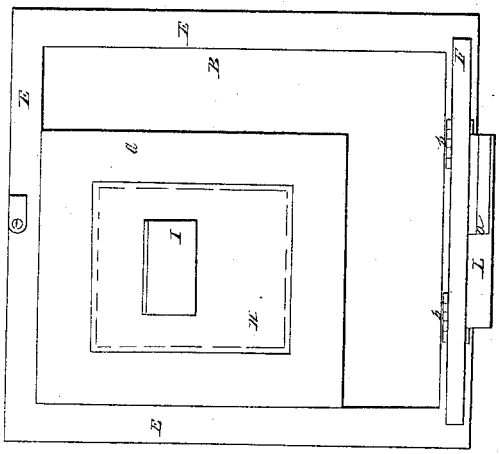

UNITED STATES PATENT OFFICE.

ALBERT S. SOUTHWORTH, OF BOSTON, MASSACHUSETTS.

PLATE-HOLDER FOR CAMERAS.

Specification forming part of Letters Patent No. 12,700, dated April 10, 1855.

*To all whom it may concern:*

Be it known that I, ALBERT S. SOUTHWORTH, of Boston, in the county of Suffolk and State of Massachusetts, have invented a new and useful Plate-Holder for Cameras for Taking Photographic Impressions, of which the following is a full, clear, and exact description, reference being had to the annexed drawings, in which—

Figure 1 is a front view; Fig. 2, a rear view; Fig. 3, a similar view, the cover being dropped into a horizontal position; Fig. 4, a vertical section through the center; Fig. 5, an end view; Fig. 6, details which will be referred to hereinafter; Fig. 7, the slider.

In taking daguerreotypes of small size for lockets it often occurs that the first picture taken is not properly timed or exposed to the light, and a second or a third is required to be taken before a perfect picture is obtained. Each picture thus taken requires a freshly-prepared plate, which causes a considerable consumption of time.

The object of my invention is to bring in rapid succession different parts of the same plate or different plates, of whatsoever material prepared, for photographic purposes into the center of the field of the lens for the purpose of either timing them differently, that the most perfect may be selected, or of taking different views of the same object with the least delay possible, or of taking stereoscopic pictures upon the same or different plates with one camera.

My invention consists in a peculiarly-arranged frame in which the plate-holder is permitted to slide, by which means I am enabled to take four daguerreotypes upon one plate and at one sitting, different portions of the plate being brought successively opposite an opening in the frame, the opening remaining stationary in the axis of the camera while the plate-holder and plate are moved.

The frame which guides the motion of the plate-holder is constructed as follows: A is a front plate, immediately in the rear of which is a zinc plate B. In the center of this plate is the hole C, (seen in blue in Fig. 2,) which is closed by the zinc slider D, Fig. 7, in the customary manner. Around the borders of this frame are the strips E. (Seen in section in Fig. 4 and in dotted lines in Fig. 1.) The rear plate F of this frame is hinged to one of the strips E at *b*. Between this plate and the zinc plate B and within the space inclosed by the strips E slides the plate-holder, which is constructed as follows: G is the frame of the plate-holder, into the rectangular opening of which is inserted the daguerreotype-plate. (Seen in red in Figs. 2 and 4 and in dotted lines in Fig. 1.) The back plate H rests against the daguerreotype-plate and holds it in place. The plate-holder thus constructed is allowed to take four different positions within its carrying-frame, so as to bring the four different portions 1, 2, 3, and 4, Fig. 2, of the plate successively opposite to the opening C. It is guided in its motions in the following manner: I is a block attached to the back plate of the plate-holder, which projects through a rectangular opening K in the hinged plate F. The block I is moved in succession into the four corners of the opening K, by which means the four different portions of the daguerreotype-plate are brought opposite to the opening C. The motions of the block I are regulated by the guide L, hinged to the plate F at *d*. When this block is in the position seen in Fig. 2, the block I rests upon its top edge and one corner of the daguerreotype-plate 3 is opposite to the hole C. When the block I is slid to the opposite corner of the opening K, still resting upon the piece L, another portion 4 of the daguerreotype-plate is brought opposite the opening C. The guide-piece L is then thrown back, as seen in Fig. 4, and the block I is allowed to drop into the right-hand lower corner of the opening K, the block I as it descends being guided by the edge *a*, and the portion 1 of the daguerreotype-plate is brought opposite the opening C. By another movement the block L is thrown into the left-hand corner of the opening K, the block I sliding in the channel *c* when the portion 2 of the daguerreotype-plate is exposed to the opening C. I am thus enabled to take four impressions upon different portions of the same plate. These may be miniatures of the same person taken, as before stated, for the purpose of selecting the best for a locket; or they may be different views of the same face taken upon the same plate for the purpose of preserving them together; or they may be daguerreotypes of different persons, as different members of a family, or, lastly, stereoscopic pictures may be thus taken with a suitably-arranged camera. It is evident that as the frame A B remains stationary the opening C when once placed on the axis of the camera will not change, and the successive pictures will all be taken with equal correctness, and the changes are so quickly made that the aperture of the camera need not be covered from first to last unless different positions or different objects are taken. The guide-piece L or some equivalent thereof is absolutely essential, as the attempt to hold the block I by hand would shake the camera or move it from its normal position while the picture was being taken.

Heretofore I have spoken of the above contrivance as calculated to take four pictures upon the same plate. It is evident, however, that it may be so arranged as to take any desired number—as six or eight, for example—without departing from the principle of my invention.

What I claim as my invention, and desire to secure by Letters Patent, is—

The within-described plate-holder, in combination with the frame in which it moves, constructed and operating in the manner and for the purpose substantially as herein set forth.

ALBERT S. SOUTHWORTH.

Witnesses:
  SAM. COOPER,
  JOHN S. CLOW.